April 30, 1968  J. F. ABEL, JR., ET AL  3,380,167
BOREHOLE EXTENSOMETER
Filed Dec. 22, 1964  3 Sheets-Sheet 2

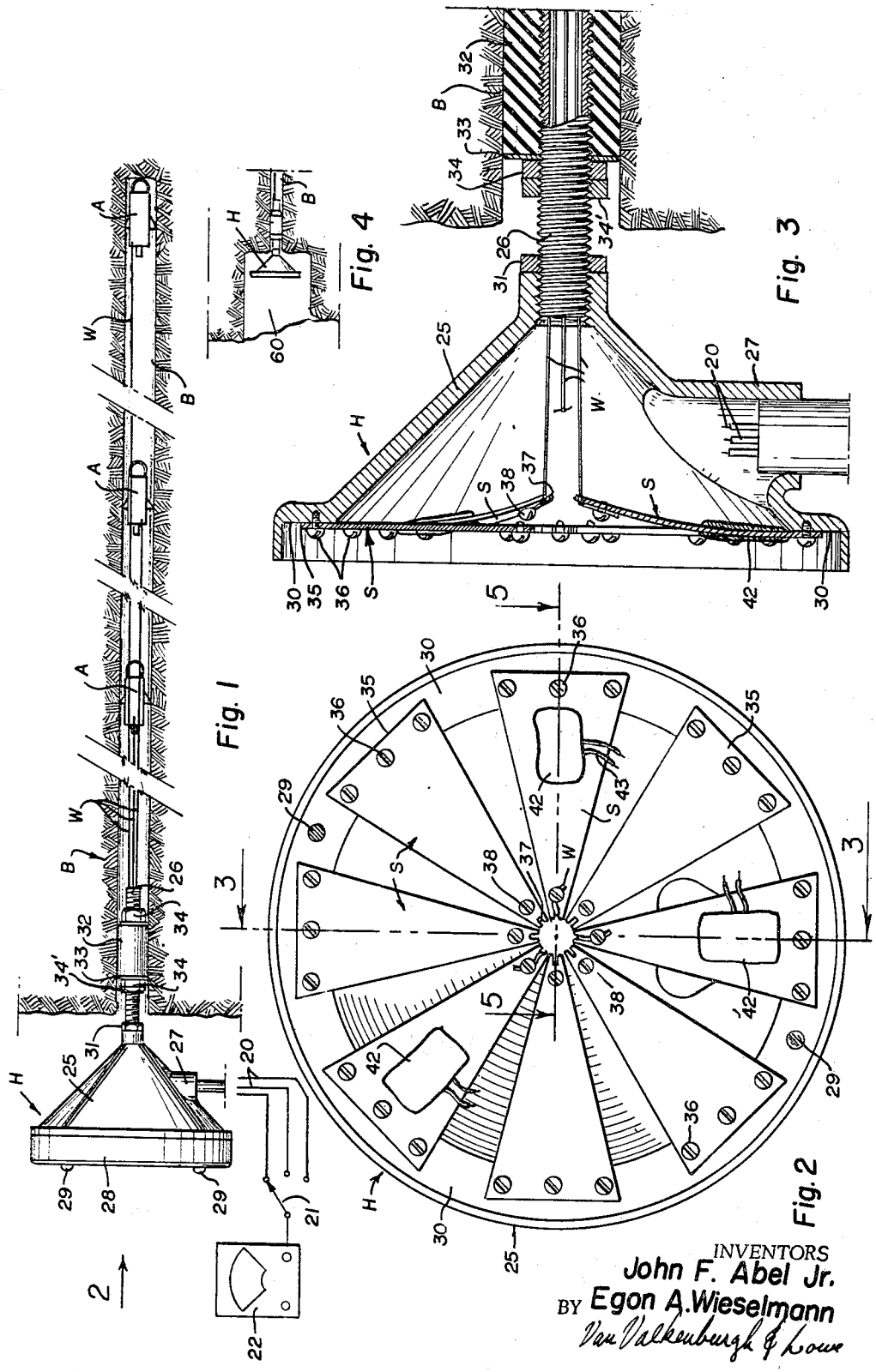

INVENTORS
John F. Abel Jr.
BY Egon A Wieselmann
Van Valkenburgh & Lowe
ATTORNEYS April 30, 1968  J. F. ABEL, JR., ET AL  3,380,167
BOREHOLE EXTENSOMETER
Filed Dec. 22, 1964  3 Sheets-Sheet 3

INVENTORS
John F. Abel Jr.
BY Egon A. Wieselmann
Van Valkenburgh & Lowe
ATTORNEYS

United States Patent Office 3,380,167
Patented Apr. 30, 1968

3,380,167
BOREHOLE EXTENSOMETER
John F. Abel, Jr., Golden, and Egon A. Wieselmann, Denver, Colo., assignors to Terrametrics, a division of Patrick Harrison, Inc., Golden, Colo., a corporation of Florida
Filed Dec. 22, 1964, Ser. No. 420,316
8 Claims. (Cl. 33—125)

This invention relates to instruments for measuring earth and rock movements, and more particularly to instruments which measure changes in the length of a borehole. Accordingly, the invention will be referred to as a "borehole extensometer" and also as an "extensometer."

The present invention was conceived and developed to avoid certain disadvantages inherent in conventional types of extensometers. One type of extensometer consists of a rigid rod having one end anchored at the bottom of a borehole as by grouting. The other end extends to the mouth of the hole where its movement is measured with respect to an abutment at the mouth of the borehole.

Wire type extensometers are also used to avoid the bulk and awkwardness of rod types especially where the borehole is of a substantial depth. For installation, one end of a wire is anchored at the bottom of a borehole and the other end extends from the mouth of the borehole. The wire is held under a selected tension to eliminate the wire-stretch factor; and longitudinal movement of the anchor point at the bottom of the borehole with respect to the mouth of the borehole is measured by movements of the wire at the mouth. A constant tension on the wire is commonly produced by use of weights, that is, by passing the wire over a pulley beyond the borehole mouth and loading it with weights. Another apparatus for applying tension to the wire uses a spring affixed to the end of the wire and held by an adjusting screw which is adapted to shift and adjust the spring to a position where the specified tension is on the wire each time a reading is to be made.

The conventional borehole extensometers, using pulleys and counterweights, are bulky and awkward, and pulley friction where weights are used can introduce an appreciable error in the observations. The type using a spring balance to pre-tension the wire is less bulky but is especially awkward to use since it must be adjusted every time a reading is to be made. Also, such an adjustment reduces the accuracy of the final readings. Neither type is satisfactory where continuous measurements are required or where comparatively rapid changes of earth movement are to be recorded. Moreover, both types are unsuitable for use where the mouth of the borehole is not easily accessible for installation and for subsequent observations.

The present invention comprises, in essence, a wire type extensometer which is held under tension by a cantilevered spring of selected resilient properties, and the movement of the wire and the flexing of the spring are permitted to act together as a single continuously-operating system. The movement between an anchor point within the borehole and a reference point at the mouth of the borehole may be easily determined by a simple transducer system which responds to the flexing action of the spring to register on a recording instrument which may be calibrated to give direct and precise readings of actual earth movements. It follows that the objects of the present invention are to provide, in a novel and improved extensometer, a simple, compact, precise and reliable instrument capable of measuring earth and rock movements in boreholes of considerable depth by simple, easily-followed procedures.

Another object of the invention is to provide a novel and improved extensometer which is especially easy to install in a borehole without elaborate and expensive preparatory steps, even at comparatively inaccessible locations, which, once installed, will require no further attention while earth movements are being recorded, and which will permit recordings to be made at a remote station.

Another object of the invention is to provide a novel and improved extensometer of a compact construction which may be used in a small-diameter borehole, and which may be easily protected from traffic, blast rock and similar hazards.

Another object of the invention is to provide a novel and improved extensometer which is especially adapted to form a multiple wire unit capable of measuring the comparative movements of a rock mass at a number of positions along the course of a small-diameter borehole to obtain detailed information concerning the rock movements over a considerable reach.

A further object of the invention is to provide a novel and improved extensometer which is a light-weight, low-inertia system capable of measuring comparatively rapid earth and rock movements.

With the foregoing and other objects in view, all of which more fully hereinafter appear, our invention comprises certain constructions, combinations and arrangements of parts and elements as hereinafter described, defined in the appended claims and illustrated in preferred embodiments in the accompanying drawing, in which:

FIGURE 1 is a diagrammatic longitudinal sectional view of a borehole in a rock mass, with portions being broken away to conserve space and with an improved, multiple-position extensometer being mounted therein for measurement of rock movement along the course of the borehole at a number of selected positions, the view showing three anchors as positioned along the course of the borehole, illustrative of one arrangement for using the apparatus, and showing further a block diagram of a circuit arrangement extending to recording apparatus.

FIGURE 2 is an end view of the extensometer head with its protective cover being removed, as taken from the indicated arrow 2 at FIG. 1, but on an enlarged scale, the view illustrating an 8-wire unit but with only 3 of the wire units being used, to agree with the showing at FIG. 1.

FIGURE 3 is a longitudinal sectional view of the extensometer head mounted in the mouth of a borehole, as taken from the indicated line 3—3 at FIG. 2.

FIGURE 4 is a fragmentary, diagrammatic sectional view, similar to a portion of the showing at FIG. 1, but on a reduced scale and illustrating one manner of protectively mounting the apparatus as in a pocket at the mouth of a borehole.

Figure 5:
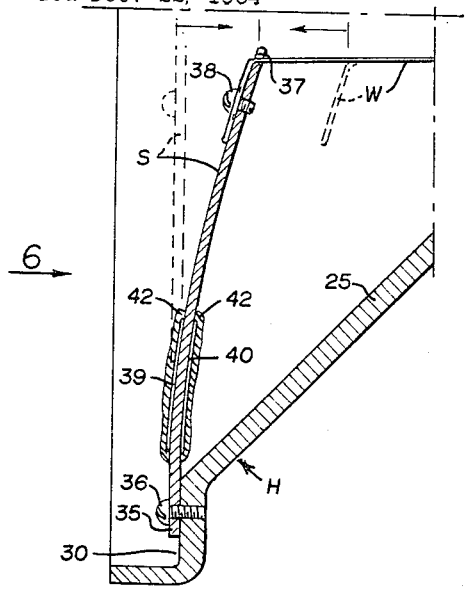
FIGURE 5 is a fragmentary, sectional view showing a single operative component of the system, as taken from the indicated line 5—5 at FIG. 2, but on a further enlarged scale and with broken lines showing the relaxed positions of the cantilever spring and wire.
Figure 6:
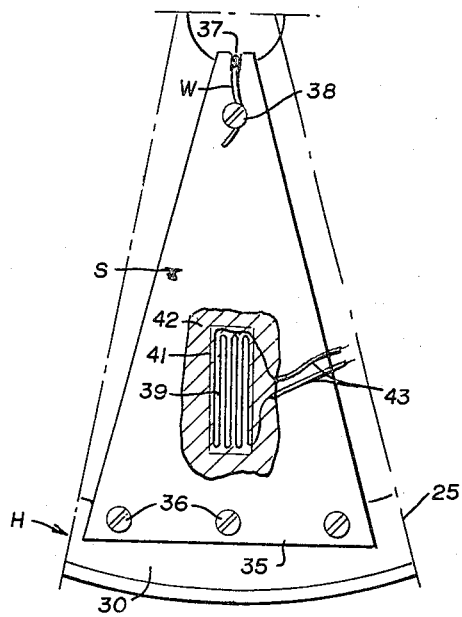
FIGURE 6 is a fragmentary end view, as taken from the indicated arrow 6 at FIG. 5, but with circuit-covering elements being broken away to better illustrate a portion of the measuring element circuits.

The present invention provides for a multiple-unit wire-type borehole extensometer which is especially adapted to be used with small-diameter boreholes, such as 2¼ inch boreholes, and which may be drilled in rock to considerable depths of more than 100 feet or even 200 feet. Accordingly, the apparatus is especially adapted to measure comparative rock movements over a considerable reach along the course of the borehole with the several wire unit extensometers by setting wire anchors at a number of selected locations along the borehole. The movements at the several locations are recorded at the head of the apparatus at the mouth of the hole and may be compared with each other to ascertain comparative movements between specific locations. The apparatus as installed, as illustrated at FIG. 1, includes a measuring head H anchored in the mouth of the borehole B, the wires W of the several units extending from the head and into the borehole and anchors A holding the remote ends of the wires within the borehole at selected intermediate and bottom positions as illustrated.

The measuring head H holds a number of cantilevered springs S connected to wires and held under tension. Electrical transducing components are associated with the springs S to provide measurable variations of the movement of the several units of the system. The transducing components are connected to circuit wires 20 which extend from an opening in the side of the head H to a selector switch 21 and thence to a recorder 22, as will be hereinafter further described.

The measuring head H is formed as a hollow conical body 25 having its apex end connected with an axially-aligned, threaded tube 26 to form a funnel-shaped structure. The body includes a side outlet 27 for the conduit 20, and a cover 28 held by screws 29 to enclose the springs S. The interior of this body 25 is likewise funnel-formed with the cavity tapering to the passageway through the tube 26 wherein the wires W pass, as from the interior of the body and into the borehole. This interior of the body is also formed with a flat circular shelf 30 about the funnel-like rim of the body which forms a base for holding springs S, as will be further described.

This threaded tube 26 is held onto the body 25 by a lock nut 31 and is of sufficiently small diameter length to provide for easy insertion into the mouth of a borehole B where it may be securely anchored to hold the instrument in position by locking onto the walls of the borehole itself. This anchoring may ordinarily be achieved without the preparation of a special holding collar or an abutment at the mouth of the borehole, for the length of the tube 26 is such that it may be inserted into the borehole a depth beyond any loose or weakened rock on the rock face at the mouth of the borehole which could spall therefrom.

A preferred form of anchor consists of a resilient collar 32 adapted to snugly embrace the extended tube 26. A washer 33 and lock nut 34 are turned onto the threads at both ends of the collar to expand the collar so it tightly grips the walls of the hole. The inner washer 33 and nut 34 may be secured to the collar 32, and a lock nut 34' may grip the outer nut 34 to facilitate tightening of the unit. With this construction, the same apparatus may be easily fitted to boreholes of different diameters.

Each cantilevered spring S is formed as a comparatively narrow, flat member of high quality steel or like material capable of flexing a substantial amount without permanent deformation. Each member is in the form of an isosceles triangle having its base 35 mounted on the circular shelf 30 of the body 25 as by screws 36 to stand inwardly therefrom in a radial pattern in the transverse plane of the shelf and with the apex end being adjacent to the axial center of the body. A selected number of these springs, such as the eight illustrated at FIG. 2, is arranged about the circular shelf 30 in a regular pattern, and the apex end of each is adapted to connect with a wire W to provide a unit of the multiple wire extensometer. To provide a simple and effective wire connection, the apex end of each spring S is provided with a radial slot 37 to hold a wire in position and an adjacent lock screw 38 turned into a tapped hole in the spring, whereunder the end of the wire may be placed to lock it in position.

It is to be noted that in installation of the apparatus in a borehole, the wires must first be anchored at selected positions in the borehole, as in a manner hereinafter described. Next, the head H is secured in place at the mouth of the borehole with the wires extending through the tube 26. Next, each wire is connected to its spring S by pulling the wire and deflecting the spring from their normally relaxed positions, which are indicated in broken lines at FIG. 5. The final balanced position where the wire is connected to the spring is with the wire stretched and the spring flexed as clearly shown at FIGS. 3 and 5.

With this arrangement, movements of the anchored end of the wire within the borehole will be accompanied by movements of the spring lever at the mouth of the borehole which are in direct proportion to each other depending upon the elastic characteristics of the wire W and the spring S. Accordingly, movements of the spring may be measured to determine the corresponding movements of the anchored end of the wire. Direct measurements of the movement of the end of the cantilever are possibly by a simple linear gage such as a common dial gage. However, where such movements are to be recorded at a remote station by an electrical gage 22, it is advantageous to use the cantilever spring as a part of the transducer system. The surface strains on the spring are related to the longitudinal movements of the wire and sensitive strain gages of the SR–4 type are available for measurement of such surface strains. Accordingly, a strain gage 39 is mounted upon the outer surface of each spring S and a complimentary strain gage 40 is mounted upon the under surface of the spring S.

Each strain gage 39 and 40 is formed on a small cloth pad 41 and consists of a small diameter wire which is folded back and forth on the pad in the lengthwise direction so as to stretch and shorten with minute changes in the length of the pad to provide for changes of the resistance of the wire which may be measured. Each pad 41 is mounted on its spring surface near the base of the spring with the wires being oriented longitudinally with the spring, and is protectively covered and encased within a tough resilient weatherproof coating 42 such as pitch or an epoxy resin. The circuit leads 43 extending from this wire are connected with suitable conduit wires 20 for ultimate connection with the recording apparatus 22.

In operation of the spring S, the two strain gages 39 and 40 act oppositely. For example, when the spring system is initially balanced, as in the position illustrated at FIG. 5, and a rock movement at the wire anchor appears to move the anchor deeper into the borehole to further flex the spring, the wires of the outward strain gage 39 stretch and the wires of the inward strain gage 40 shorten. This reverse action advantageously permits the two gages to be incorporated in a recording system as the opposing legs of a Wheatstone bridge. The other components of the bridge are in the recording apparatus 22 and with the conduit wires 20 suitably interconnecting the system as bridge arm circuit wires 20 and a common balance circuit wire 20'.

Figure 8:
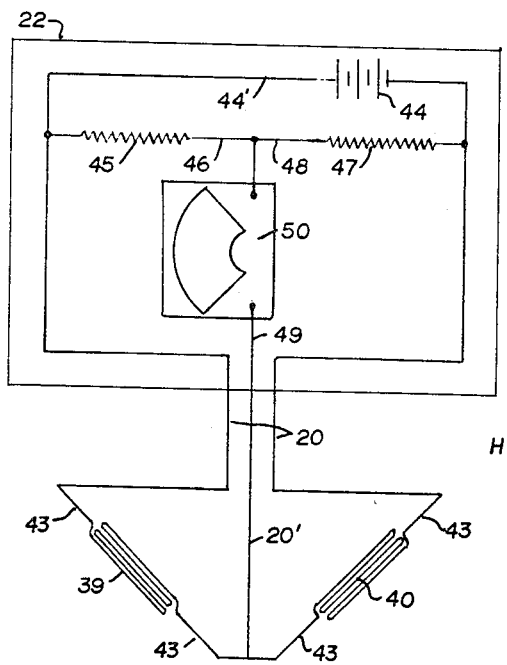
FIGURE 8 is a circuit diagram of the electrical transducer components of a single operative unit of the system and of portions of one type of recording apparatus.

The circuit diagram at FIG. 8 includes the strain gages 39 and 40 as components on two legs of the bridge, which are interconnected by leads to the recorder 20. Other circuits completing the bridge are in the recorder, including a battery 44 on an infeed circuit loop 44', a resistor 45 on a third arm 46 and a resistor 47 on a fourth arm 48 of the bridge. The arrangement is completed by a balance circuit 49 which includes the common conduit wire 20' and a galvanometer 50. This galvanometer is sensitive to current flow caused by the cumulative resistance imbalance of the strain gages whenever the spring flexes. While this arrangement provides for a sensitive, accurate recorder 22, it is to be understood that other types of conventional recording apparatus for strain gages may be used.

Each unit of the apparatus is completed with a wire anchor A within the borehole at its selected locations. A preferred form of anchor, which is especially adapted for multiple wire units in small diameter boreholes, consists of a flat, rectangular body block 51 which is adapted to be inserted longitudinally into a borehole as by a rod, not shown. To facilitate this insertion, the trailing, outwardly-facing end of the block includes a longitudinal, rearwardly-extended boss 52 adapted to be gripped and held by the end of the insertion rod while it is being placed in the hole. A wire attachment screw 53 is also located adjacent to the trailing end of the block and at one side thereof to provide a minimum of interference with other wires from other anchors within the borehole.

This body block 51 is provided with a locking means at its sides which permit it to be easily inserted into a borehole but to be securely locked into position against withdrawing forces such as by a pull of a wire W attached thereto. The locking means includes wedge blocks 54 which are slidably held in grooves 55 at the sides of the block, the blocks being tapered and the grooves diverging from maximum depth at the trailing end of the blocks in a manner as to cause the wedges to spread apart when the block is pulled outwardly by the wire and the wedges are being held against the walls of the borehole.

A U-shaped yoke 56 is connected to the leading end of each wedge 54 to extend forwardly, and inwardly, of the leading end of the block, and a longitudinally disposed guided rod 57 is connected to the center of this yoke to hold it in alignment, the rod extending rearwardly therefrom and into a longitudinal socket 58 in the leading end of the block 54. A compression spring 59 about this rod 57 urges the yoke and wedges carried upon it forwardly, and inwardly, with respect to the block and thereby urges the wedges towards a spread-out position to facilitate their being locked into the walls of the borehole.

Certain modifications, additions and alternatives to the apparatus above described enhance its value in special situations. At FIG. 4, the borehole B is illustrated as being provided with a pocket 60 at the rock face which is of a diameter sufficient to receive the head of the apparatus. Ordinarily, the boreholes are prepared at comparatively sheltered locations as, for example, in natural pockets formed by overbreak in a tunnel. However, in installations where such is not possible, a pocket 60 may be formed, and even capped by a suitable lid to completely protect the apparatus from blast rock, traffic and the like.

Figure 7:
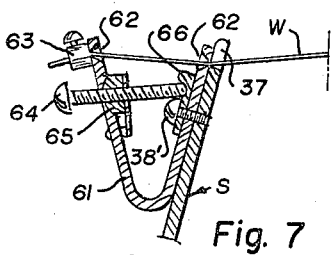
FIGURE 7 is a fragmentary, sectional view, similar to a portion of the showing at FIG. 5, but illustrating a wire tension adjusting arrangement.

At certain installations, it is desirable to carefully adjust the tension on the wire and spring S, and such may not be possible with the simple manual arrangement above described. FIG. 7 illustrates one form of adjusting means adapted to be attached to the end of a spring S. This adjuster includes a flexible U-shaped yoke 61 having one arm which is secured to the spring by a holding screw 38' and a second arm which upstands therefrom. The wire W is extended through the spring slot 37 and thence through orifices 62 at the end of each arm of the yoke. It is then held by a lock clamp 63 beyond the upstanding arm of the yoke. These arms are spread and held apart by an adjusting screw 64 which is carried in a nut 65 on the upstanding arm and extends therethrough to bear against an abutment 66 on the base arm. Once a preliminary setting of the wire is made manually to place the lock clamp 63 in its approximate proper position on the wire, more precise, finer adjustments of tension are made with the adjusting screw 64.

Figure 9:
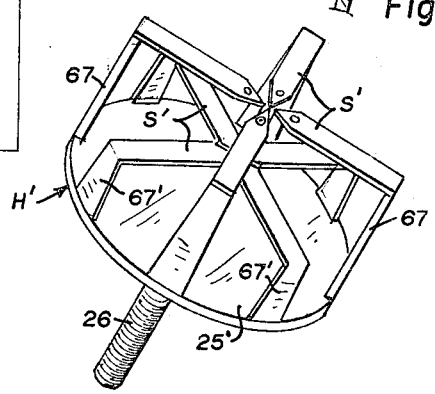
FIGURE 9 is a small-scale isometric view of an extesometer head constructed according to the principles of the invention, but of a modified construction more suitable at installations where comparaively large earth movements may occur.
Figure 11:
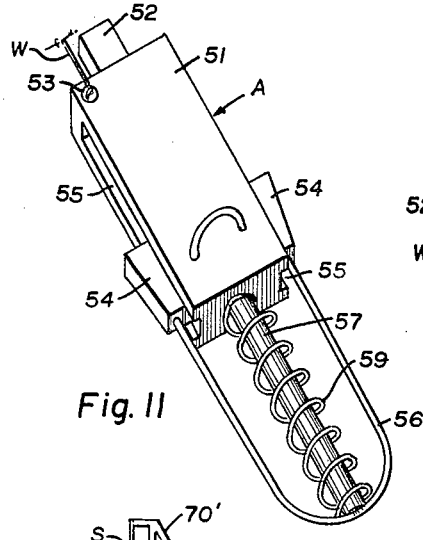
FIGURE 11 is an isometric view of an improved construction of a wire anchor adapted to be inserted into a borehole.
Figure 12:
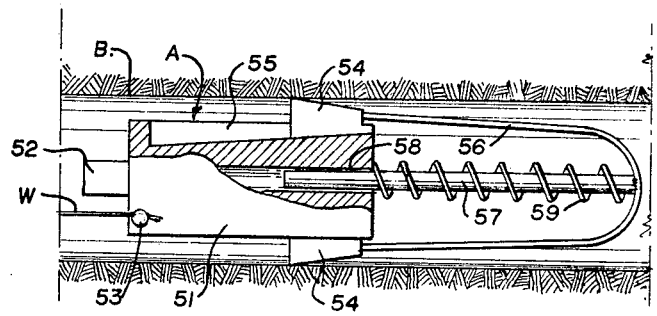
FIGURE 12 is a fragmentary, sectional portion of the borehole with the improved anchor in place.
Figure 10:
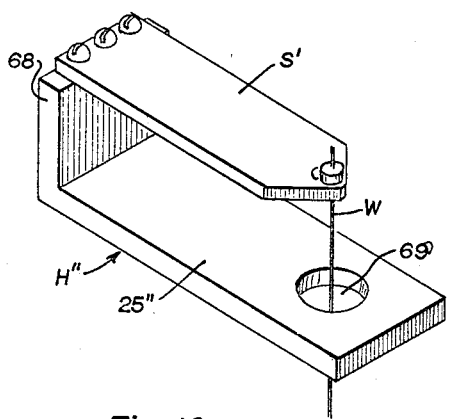
FIGURE 10 is an isometric view of the head of a single-wire extensometer unit constructed according to the invention.

The basic construction of the head H may be modified as in the manner illustrated at FIGS. 9 and 10. The arrangement shown at FIG. 9 is an 8-unit head H' wherein the cantilever springs S' are formed as flat rectangular plates which are mounted upon outer posts 67 and inner posts 67' about the periphery of a body 25' formed as a flat disc. Four outer posts are provided in an arrangement where the posts stand from the periphery of the disc 25' at 90-degree spacings to carry four radially-disposed, inwardly-extended spring levers S'. The four inner posts 67' are shorter and likewise stand from the periphery of the disc 25' at 90-degree spacings, but straddling the outer post spacings. The disc 25' includes a central orifice, not shown, which communicates with the passageway of an axially aligned threaded tube 26, the same as hereinbefore described. Other features of construction are substantially the same as that heretofore described.

This modified head H' is especially suitable at installations where comparatively large deflections are to be anticipated since the posts 67 and 67' may also be designed to deflect as well as the arms if such is desired. Also the modified unit is somewhat more accessible for adjustments although not as well protected as the above described head H.

In the single-wire unit illustrated at FIG. 10, the head H" consists simply of a flat plate 25" adapted to be placed over a borehole mouth and held in any suitable manner as by clamps. A post 68 upstands from an end of this base to hold a rectangular spring S' the same as above described. A wire W extending from the borehole will pass through an orifice 69 in the head plate H" for connection with the end of the spring S'. Other components are the same as hereinbefore described.

When the apparatus is properly positioned within a borehole B, each unit consisting of a cantilever spring S and a wire W, held together under tension, will act as a single elastic system to measure movements of the anchor A within the borehole with respect to the head H secured at the mouth of the borehole. It is to be noted that such movements are relative and that actually, the rock mass at considerable depth will ordinarily remain fixed while the face of the rock mass where the head H is located will ordinarily move the maximum distance. However, the positioning of a number of anchors within the borehole provides information as to their relative movements between selected anchors, and thus important information may be obtained. For example, the stability of a rock face in a tunnel or the like may be ascertained, and also the maximum depth at which rock movements occur can be easily determined by the several comparative measurements.

It is to be noted that the movements at the point connecting the spring and wire are not the same as the movements of the anchor itself because of varying tension on the wire as the spring flexes. This changes the length of the wire by a small but sometimes significant amount, depending upon its elasticity and length. Comparative elastic factors and correction factors may be applied to such differential movements.

For field use as where the deflection readings of the SR-4 strain gages 39 and 40 are to be read by the recorder 22, it is desirable to pre-calibrate the strain gages, and this may be done with a short wire length to which a correction factor may be applied or with a full length wire where correction factors will not be necessary. Methods and apparatus for such measurements are easily devised, and such apparatus is illustrated at FIGS. 13 and 14.

Figure 13:
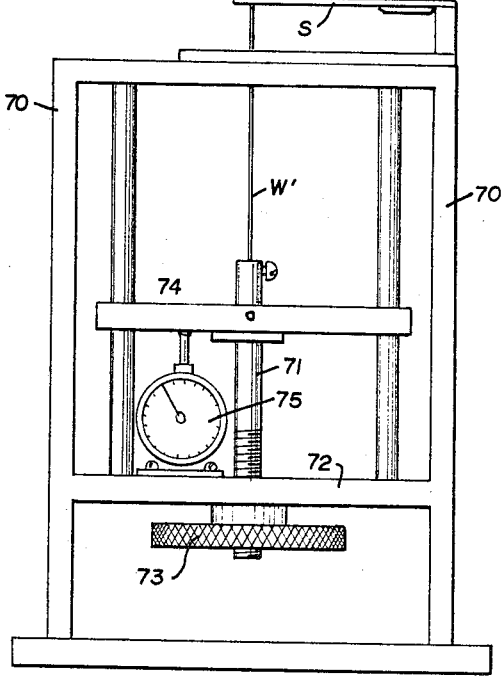
FIGURE 13 is a longitudinal view of apparatus for calibrating the spring component of an extensometer unit.

The apparatus at FIG. 13 is adapted to calibrate the actual deflections of a selected spring lever S. This measuring apparatus consists of a box-like frame 70 having a spring S whose strain gages are connected to a recorder in a proper manner. This gage is cantilevered from one end of the frame to connect with a test wire W'. The other end of the wire is connected with a threaded carrier rod 71 which extends through an orifice in a cross arm 72 of the frame to be there held by a pulling wheel 73 which is adapted to be turned to pull the carrier rod into it and deflect the spring S attached thereto. A cross arm 74 is carried on the pull rod 71 to move with it and depress the actuator of a micrometer strain gage 75 mounted upon the cross arm 72. The movements of the cross arm 74 towards the arm 73 and flexure of the spring S are thus precisely measured on the recorder 22. Suitable correction factors may be applied for actual installation.

Figure 14:
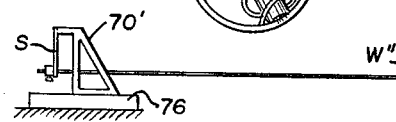
FIGURE 14 is a diagrammatic, small scale view of apparatus similar to FIG. 13 which may be used where it is desirable to calibrate a complete unit, including the head and wire of a specified length.

The apparatus illustrated at FIG. 14 is substantially similar to that illustrated at FIG. 13, excepting components of the frame 70' are separated and mounted upon fixed abutments 76 located a substantial distance apart. The cantilevered spring arm S is mounted upon one frame portion 70' and the rod 71, cross arm 72, pull wheel 73, cross arm 74' and gage 75 are mounted upon the other frame portion 70'. A full length test wire W'' is used in this calibration, and it may be the same wire W as used in a field installation. Calibrations on recorder 22 obtained by flexing the spring S thus indicate the actual movement of remote position as at an anchor with respect to spring S without the need of correction factors.

We have now described our invention in considerable detail; however, others skilled in the art can build and devise alternate and equivalent constructions, which are within the spirit and scope of the invention. Hence, we desire that our protection be limited, not by the constructions illustrated and described, but only by the proper scope of the appended claims.

We claim:
1. Apparatus for measuring rock movement in a borehole comprising:
an anchor means adapted to be secured in the borehole at a selected position therein and to hold the end of a wire;
a stretchable wire secured to the anchor means and adapted to extend to the mouth of the borehole;
a support head at the mouth of the borehole;
a cantilever spring means mounted upon the head and laterally disposed with respect to the wire, the outstanding end of said spring means being aligned with the wire and said spring means being adapted to flex in the direction of the borehole axis;
means for connecting the wire with the spring means with sufficient tightness to stretch the wire and flex the spring means, whereby the wire and spring means are deflected together as an elastic system responsive to changes of length of the borehole and said spring means reflects both changes in length of the borehole and changes in wire tension caused by changes in the length of the borehole; and
transducer recording means including a strain gauge affixed to said cantilever spring means for measuring the flexing of the spring means, whereby to permit determination of the rock movement, as indicated by changing of the borehole length between the anchor means and the support head.

2. In the apparatus defined in claim 1, wherein:
said connecting means includes a notch at the end of the arm and a lock screw on the arm adjacent to the notch.

3. In the apparatus defined in claim 1, wherein:
said transducer means includes a strain measuring gauge affixed to the outer side of the cantilever spring means and a second strain measuring gauge affixed to the inward side of the cantilever spring means, whereby movement of the cantilever spring means will stretch the components of one measuring gauge and shorten the components of the other measuring gauge.

4. The apparatus defined in claim 3, wherein:
said strain measuring gauges each include a variable electrical resistance; and
said strain measuring means includes an electrical bridge, with the resistances of the two strain measuring gauges constituting opposing legs of said bridge.

5. In the apparatus defined in claim 1, wherein:
said support head includes a tube insertable into the borehole, with the wire extending therethrough; and
collar means carried on the tube for securing and anchoring the head in the borehole.

6. Apparatus for measuring rock movement in a borehole comprising:
an anchor means adapted to be secured in the borehole at a selected position therein and to hold the end of a wire;
a stretchable wire secured to the anchor means and adapted to extend to the mouth of the borehole;
a support head at the mouth of the borehole and formed as a circular member carried on an axially centered tube, said tube being adapted to be inserted into the borehole with the wire extending therethrough, and collar means on the tube for anchoring the support head in the borehole;
spring means mounted upon the head and adapted to flex in the direction of the borehole axis biased away from the borehole, said spring means being mounted upon said head in radial alignment and at a radial sector, whereby to permit the mounting of a plurality of spring means thereon to hold a plurality of wires extending from the borehole;
means for connecting each wire with each spring means with sufficient tightness to stretch the wire and flex the spring means, whereby the said wire and spring means will deflect together as an elastic system responsive to changes of length of the borehole at the position of the anchor means for the wire connected to the corresponding spring means; and
transducer recording means for measuring the flexing of each spring means.

7. Apparatus for measuring rock movement in a borehole comprising:
an anchor means adapted to be secured in the borehole at a selected position therein and to hold the end of a wire;
a stretchable wire secured to the anchor means and adapted to extend to the mouth of the borehole;
a support head at the mouth of the borehole formed as a circular member having an axially centered tube extending therefrom, said tube being adapted to be anchored in the mouth of the borehole with the wire extending therethrough;
a spring means formed as a cantilever arm fixed to the peripheral edge of the head and extending inwardly in a radial manner, whereby said head will support a plurality of spring arms with each arm connected to a wire extending from the borehole and through the tube;
means for connecting each wire with the corresponding spring means with sufficient tightness to stretch the wire and flex the spring means, whereby the said wire and spring means will deflect together as an elastic system responsive to changes in the length of the borehole at the position of the anchor means for the wire corresponding to the respective spring means; and transducer recording means adapted to measure flexing of each spring means.

8. Apparatus for measuring rock movement in a borehole comprising:

an anchor means adapted to be secured in the borehole at a selected position therein and to hold the end of a wire;

a stretchable wire secured to the anchor means and adapted to extend to the mouth of the borehole;

a support head at the mouth of the borehole formed as a funnel-shaped cone having a spout-like, tubular member outstanding therefrom, said tubular member being adapted to be anchored in the mouth of the borehole with the wire extending therethrough;

a spring means formed as a radially disposed cantilever arm mounted upon the periphery of the cone base to extend inwardly therefrom, whereby a plurality of spring means may be mounted on said head for connection to a plurality of wires extending from the borehole and through said spout portion;

means connecting each wire with a corresponding spring means with sufficient tightness to stretch the wire and flex the spring means, whereby each spring means and its corresponding wire will deflect together as an elastic system responsive to changes of length of the borehole at the position of the anchor means for the corresponding wire; and transducer recording means for measuring the flexing of each spring means.

References Cited

UNITED STATES PATENTS

| | | | |
|---|---|---|---|
| 3,327,396 | 6/1967 | Waddell | 33—125 |
| 1,524,288 | 1/1925 | Burns | 166—211 |
| 1,932,682 | 10/1933 | Beckley | 73—95 |
| 1,987,787 | 1/1935 | Miller | 73—95 |
| 2,127,900 | 8/1938 | York | 166—211 |
| 2,316,975 | 4/1943 | Ruge | 73—141 |
| 2,857,758 | 10/1958 | Snyder | 73—90 |
| 3,111,655 | 11/1963 | Kotarsky et al. | 73—88 |
| 3,214,960 | 11/1965 | Nielsen et al. | 73—1 |

FOREIGN PATENTS

| | | |
|---|---|---|
| 960,290 | 10/1949 | France. |
| 867,730 | 5/1961 | Great Britain. |
| 536,063 | 5/1941 | Great Britain. |

OTHER REFERENCES

Borehole Extensometer, Quarterly of the Colorado School of Mines, vol. 52, No. 3, pp. 174–177, July 1957.

RICHARD C. QUEISSER, *Primary Examiner.*

JAMES J. GILL, *Examiner.*

JAMES H. WILLIAMSON, *Assistant Examiner.*